United States Patent [19]

Kinoshita, Yoshiro

Best Available Copy

[11] E Re. 30,414

[45] Reissued Oct. 7, 1980

[54] PROCESS FOR PRODUCING A HIGH TENSILE STRENGTH, HIGH YOUNG'S MODULUS CARBON FIBER HAVING EXCELLENT INTERNAL STRUCTURE HOMOGENEITY

[75] Inventor: Yoshiro Kinoshita, Masaki, Japan

[73] Assignee: Toray Industries, Inc., Tokyo, Japan

[21] Appl. No.: 37,665

[22] Filed: May 10, 1979

Related U.S. Patent Documents

Reissue of:

[64] Patent No.: 4,065,549
Issued: Dec. 27, 1977
Appl. No.: 713,629
Filed: Aug. 12, 1976

U.S. Applications:

[62] Division of Ser. No. 622,954, Oct. 16, 1975, abandoned.

[30] Foreign Application Priority Data

Oct. 21, 1974 [JP] Japan ..... 49-120365
Dec. 2, 1974 [JP] Japan ..... 49-138217

[51] Int. Cl.[3] ..... D01F 9/14; D01F 9/22

[52] U.S. Cl. ..... 423/447.6; 8/115.5; 264/29.2; 423/447.2; 423/447.4

[58] Field of Search ..... 423/447.1, 447.2, 447.4, 423/447.6, 447.7, 447.8; 264/29.2; 8/115.5

[56] References Cited

U.S. PATENT DOCUMENTS

| | | | |
|---|---|---|---|
| 3,567,380 | 3/1971 | Townsend | 423/447.6 |
| 3,671,192 | 6/1972 | Ezekiel | 423/447.6 |
| 3,673,035 | 6/1972 | Whitney | 423/447.6 X |
| 3,681,023 | 8/1972 | Tabata et al. | 423/447.6 X |
| 3,705,236 | 12/1972 | Ishikawa et al. | 423/447.6 |
| 3,914,960 | 10/1975 | McGuffin et al. | 423/447.6 |

FOREIGN PATENT DOCUMENTS

| | | | |
|---|---|---|---|
| 1128043 | 9/1969 | United Kingdom | 423/447 |

OTHER PUBLICATIONS

Barnet et al. "Carbon" 1973, vol. 11, pp. 281-288.

*Primary Examiner*—Edward J. Meros
*Attorney, Agent, or Firm*—Miller & Prestia

[57] ABSTRACT

High tensile strength, high Young's modulus carbon fiber, free from holes and voids having a statistical probability of holes detected by a standard plasma etching test of less than about 2%, a tensile strength of at least about 150 kg/mm$^2$ and a Young's modulus of at least about $15\times10^3$ kg/mm$^2$. The carbon fiber has excellent homogeneity of internal structure and excellent reliability as a composite material.

A process is provided for producing a high performance, high quality carbon fiber having excellent productivity and operability and requiring only a short time for oxidation. The process comprises converting an organic polymeric fiber (preferably an acrylic fiber) to an oxidized fiber, comprising repeatedly bringing said fiber into contact with the surface of a heated body such as a heated roll or heated plate at about 200°-400° C. in the presence of an oxidizing gas for a contact time per single contact of said fiber with the surface of the heated body of less than about 1 second, and heating the resulting oxidized fiber in an atmosphere of an inert gas at a temperature of at least about 800° C. to thereby convert the oxidized fiber to a carbon fiber.

31 Claims, 17 Drawing Figures

FIG. I.
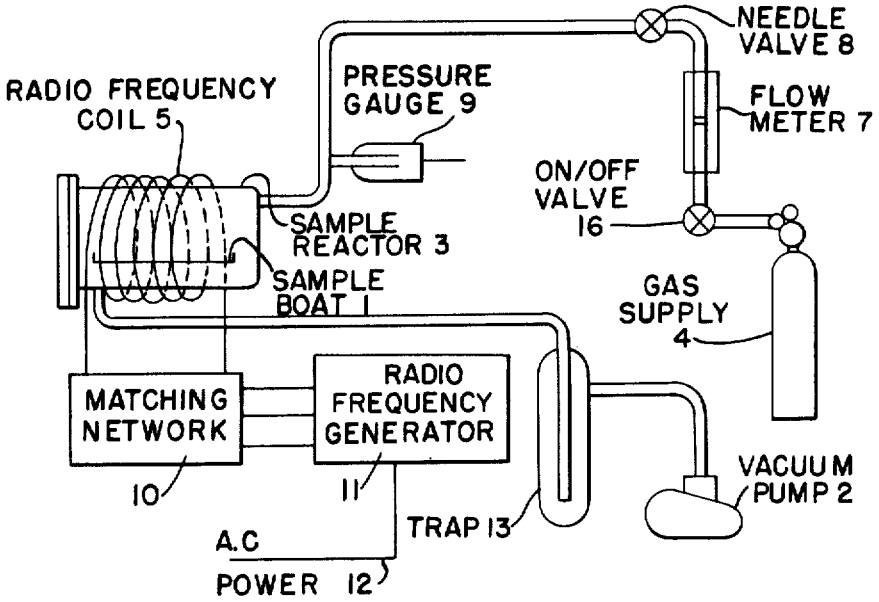
FIG. II.
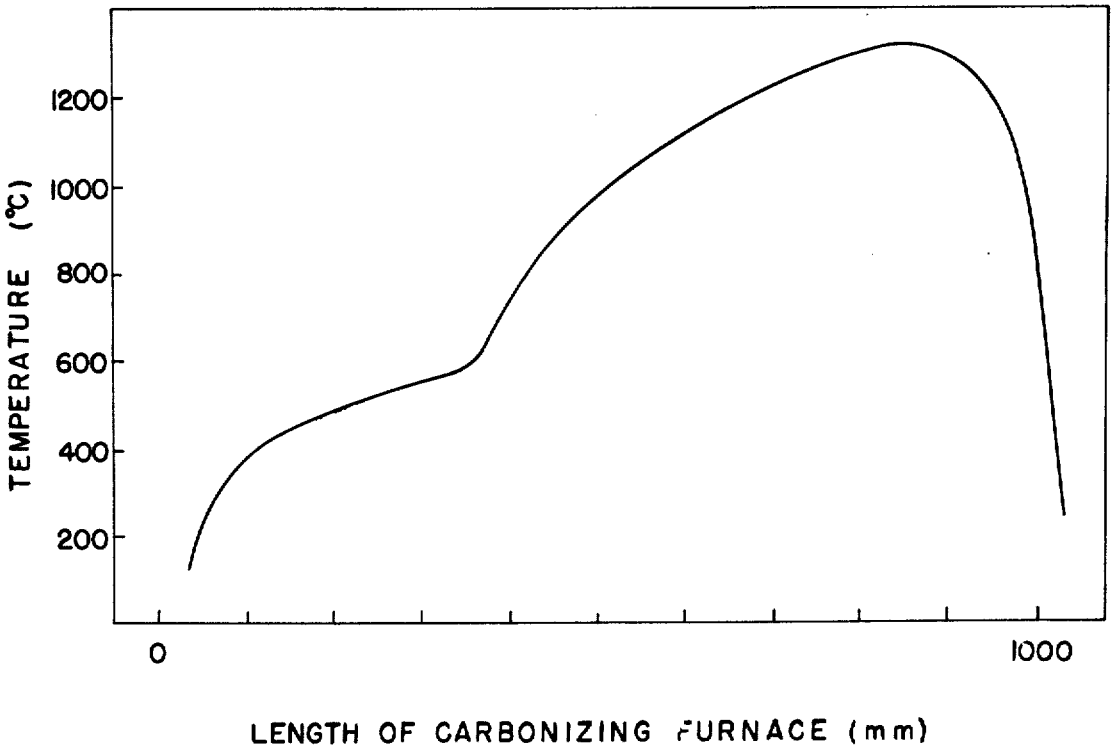

PROCESS FOR PRODUCING A HIGH TENSILE STRENGTH, HIGH YOUNG'S MODULUS CARBON FIBER HAVING EXCELLENT INTERNAL STRUCTURE HOMOGENEITY

Matter enclosed in heavy brackets [ ] appears in the original patent but forms no part of this reissue specification; matter printed in italics indicates the additions made by reissue.

This is a division of application Ser. No. 622,955, filed Oct. 16, 1975, now abandoned.

GENERAL FIELD OF THE INVENTION

The present invention relates to a *process for producing a* carbon fiber of high tensile strength and high Young's [moudlus] *modulus*, having excellent homogeneity of internal structure[, and further relates to a process for producing the same.].

DISCUSSION OF THE PRIOR ART

Because carbon fibers have many excellent properties such as high corrosion resistance and temperature resistance, low density, high strength and high modulus, etc., they have heretofore been used as composites for many purposes such as aerospace structural components, rocket motor casings, deep submergence vehicles, ablative materials for heat shields on re-entry space vehicles, etc.

Such carbon fibers are normally produced by subjecting an organic polymeric fiber such as an acrylic fiber, cellulose fiber (rayon) or polyvinyl alcohol fiber to oxidation in an atmosphere containing an oxidizing gas heated to about 200°–400° C., and thereafter subjecting the resulting oxidized fiber to carbonization by heating the fiber in an atmosphere of an inert gas maintained at a high temperature greater than about 800° C.

In carbon fibers obtained by such known processes, as suggested for example in U.S. Pat. No. 3,412,062, holes and voids (hereinafter referred to as visible holes) are sometimes formed. The existence of such visible holes sometimes harms the performance and quality of the product as a composite, requiring many tests in respect to performance and quality for ensuring the confidence of the product upon producing a new product or developing a new use.

In order to prevent formation of visible holes inside such carbon fibers, a method is suggested in U.S. Pat. No. 3,412,062 which oxidizes said organic polymeric fiber by heating said fiber in an atmosphere of a high temperature oxidizing gas, heating the fiber for a sufficient period of time so that oxygen may permeate to the core of the fiber to make the fiber an oxidized fiber having essentially no biconical structures. In other words, when organic polymeric fibers are subjected to oxidation by heating the fibers for a short period of time, a biconical structure tends to be formed inside each fiber, and oxidized fibers having such biconical structures tend to form visible holes by carbonization. This means that it is substantially impossible to improve the productivity, the quality and the performance of carbon fibers by this known process.

Again, in the aforementioned known process, an oven is required in order to keep the oxidizing gas at a predetermined temperature necessary for heating the fibers. When such an oxidizing oven is used, the thermal decomposition products formed inside the oven adhere to the oven wall and accumulate on accessories such as guides, etc. provided inside the oven. Adherence and accumulation of such thermal decomposition products (e.g. tar) not only make the conservation and administration of the oven troublesome, such as periodic cleaning, but also such thermal decomposition products often adhere to the organic polymeric fibers passing through the oven, lowering the performance and quality of the resulting carbon fibers. Accordingly, it is difficult to adopt this process for continuous oxidation wherein the oxidation process is directly connected to the process for producing the organic polymeric fiber, without obtaining the undesirable formation of biconical structures, and with ease of operating and maintaining the oxidizing oven.

Further, Barnet et al ("CARBON", Vol. 11, No. 14, pages 281–288, 1973) report facts resulting from subjecting many commercially available carbon fibers considered to have been produced by such known process to the plasma etching treatment and observing the treated surface of these fibers under a scanning electron microscope. They report that various types of holes are formed by the plasma etching treatment. This fact suggests that hitherto known carbon fibers generally do not have visible holes inside them, and even if they are apparently homogeneous, they are not necessarily actually homogeneous, but they have latently heterogeneous internal structures.

Namely, when it is considered that a carbon fiber is used as a composite material under strict conditions at an ultra-high temperature or an ultra-low temperature such as for a space vehicle, an aeroplane, a rocket engine, etc. and it is difficult to foresee the defects of a composite material under such conditions. The latent heterogeneous structure including holes detected by the plasma etching test (hereinafter referred to as latent holes) causes the carbon fiber to lose reliability as a composite material. Upon using this composite material for a new use of upon designing a product including the use of such material, it becomes necessary to carry out many careful tests and many special precautions are required to prevent unforeseeable defects from presenting themselves.

OBJECTS OF THE INVENTION

An object of the present invention is to provide a highly homogeneous, high strength, high modulus carbon fiber.

Another object of the present invention is to provide a latently homogeneous, high tensile strength, high Young's modulus carbon fiber having a low statistical probability of containing detectable latent holes, by use of the standard plasma etching test, to be in greater detail later.

Still another object of the present invention is to provide an industrially advantageous process for producing a carbon fiber, wherein the organic polymeric fiber is converted to a oxidized fiber within a short period of time.

Still another object of the present invention is to provide a process for eliminating difficulties accompanying oxidation using a high-temperature oxidizing gas.

A further object of the present invention is to provide a process for producing a carbon fiber substantially without requiring an oxidizing oven, which process is advantageous in use of available facilities and in general administration.

Other objects will become apparent from the following description.

SUMMARY OF THE INVENTION

One characteristic of the novel carbon fibers according to the present invention, is that it has a statistical probability of containing latent holes which are detectable by the hereinafter defined standard plasma etching test of less than about 2%, preferably less than about 0.2%, a tensile strength of at least about 150 kg/mm$^2$, preferably at least about 180 kg/mm$^2$ and a Young's modulus of about $15\times10^3$ kg/mm$^2$, preferably at least about $17\times10^3$ kg/mm$^2$.

The characteristics of the process for producing the carbon fibers according to the present invention, and for achieving the aforesaid objects, resides in the combination of (a) an oxidation process which comprises repeatedly bringing the organic polymeric fibers into and out of contact with the surface of a heated body at about 200°–400° C. in the presence of an oxidizing gas to heat said fibers, wherein the contact time ($T_1$) per single contact between said fibers and said heated body is kept at below about 1 second, and (b) a carbonization process which comprises heating the resulting oxidized fibers in an atmosphere of an inert gas at a temperature of at least about 800° C.

BRIEF DESCRIPTION OF THE DRAWINGS

FIG. 1 is a flow diagram showing a plasma etching apparatus used for the standard plasma etching test which is utilized as a test procedure in testing products made according to the present invention.

FIG. 11 is a graph showing the relationship between the oven length and the temperature used in the carbonization step according to this invention, showing the temperature profile of the carbonization furnace used in the carbonization.

DETAILED DESCRIPTION OF THE INVENTION

Figure 2:
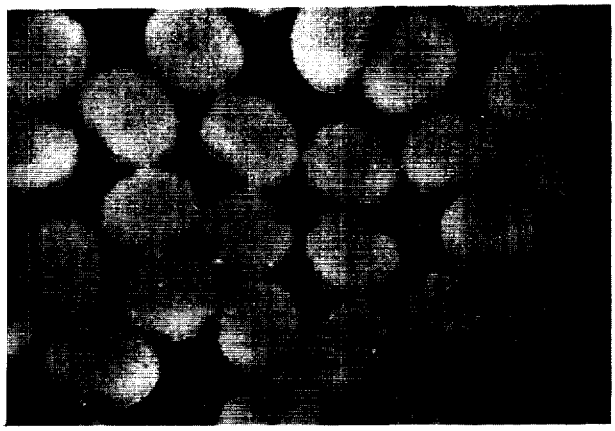
FIGS. 2–4 are scanning electron photomicrographs showing the etched conditions of carbon fibers treated in accordance with a plasma etching test of FIG. 1, for varying periods of time.

The statistical probability of the presence of latent holes detectable by the standard plasma etching test defined hereinafter is a value determined in accordance with the following measurement method.

A carbon fiber is embedded in 100 parts by weight of epoxy resin ("Epikote 828," manufactured by Shell Oil Co.) containing 5 parts by weight of a complex of boron trifluoride ($BF_3$) and monoethylamine (MEA) and then heated at 170° C. for 1 hour to precure the resin, and then, the carbon fiber is postcured at 170° C. for 2 hours to prepare a test piece which is about 150 mm long, about $6\times2$ mm$^2$, and contaning 60% of said carbon fiber, wherein said carbon fiber is arranged unidirectionally. This test piece is cut with a diamond saw so that the cross section of said fiber is exposed on the cut surface. This cut surface is polished successively by 180, 500, 1000 and 2000 mesh sandpapers, respectively. Referring to FIG. 1 of the drawings, this polished test piece is placed in a sample boat 1 of a plasma etching apparatus (Type 10003B, manufactured by International Plasma Corp.) and a vacuum pump 2 of said apparatus is driven to bring the internal pressure of reactor 3 to 0.01 Torr. Into the reactor 3, 0.5–1.0 Torr. of oxygen gas is supplied from a gas supply inlet 4. Thereafter, a radio frequency coil 5 is energized to start the oscillation of a radio wave and to excite oxygen gas inside the reactor 3 to generate oxygen plasma. The generated oxygen plasma is irradiated perpendicularly to the polished surface of the test piece. After irradiating the oxygen plasma against the polished surface of the test piece for about 30 minutes, the test piece is taken out from the reactor 3, the polished surface of the test piece is washed with methanol and then dried. The resulting polished surface of the test piece is coated with a palladium-platinum alloy in a vacuum coater, examined under a scanning electron microscope (Type HSM-2B, manufactured by Hitachi Limited of Japan) and photographs of the polished surface of the carbon fiber which has been treated with plasma etching are taken.

Ten photographs per single sample are taken by changing the field of vision at a magnification at which about 60–80 carbon fibers may be photographed per single field of vision.

From the photographs taken, a count is taken of the number of carbon fibers in which holes are formed by the plasma etching treatment. The probability of holes being detected is calculated by a statistical method.

The statistical probability of holes being detected by the standard plasma etching test of the present invention referred to above, as will be apparent from the aforesaid measurement, includes holes and voids already existing in the carbon fiber before it is treated with the plasma etching process, namely, visible holes as objects of calculating the aforesaid statistical probability.

In the standard plasma etching test, the shapes of the holes vary, depending upon the time of the plasma etching treatment, and this treatment time affects confirmation of existence (or otherwise) of holes formed. Therefore, it is necessary to establish the treatment time at about 30 minutes. Namely, FIGS. 2–4 are scanning electron photomicrographs showing the etched conditions of a commercially available carbon fiber made from an acrylic fiber by varying the treatment time of plasma etching.

Figure 3:
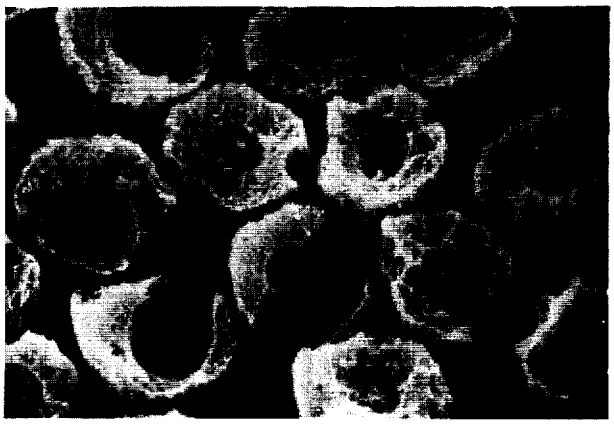
Figure 4:
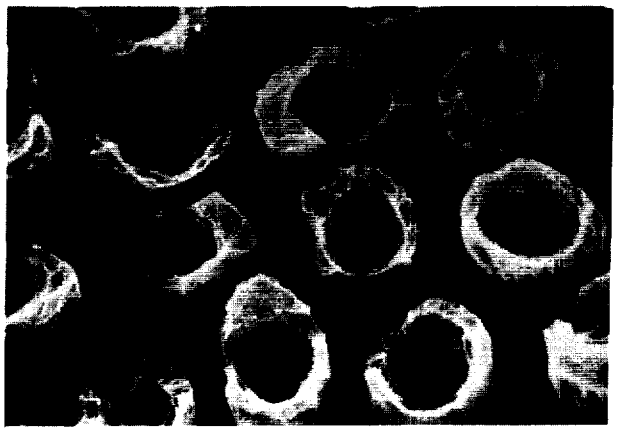

FIG. 2 shows a carbon fiber which has not been treated by plasma etching,

FIG. 3 shows a carbon fiber after treatment by plasma etching for 15 minutes, FIG. 4 shows a carbon fiber after treatment by plasma etching for 30 minutes. As is apparent from FIGS. 2–4, when the treatment time is shorter than 30 minutes, formation of holes is insufficient. When said time exceeds 30 minutes, the shape of the fiber is lost and confirmation of formation (or otherwise) of holes is difficult.

In the standard plasma etching test as referred to in the present invention, besides holes and voids such as hollow holes and/or radial cores, cracks or chaps are observed. In calculation of the statistical probability of latent holes being detected by the standard plasma etching test, these are hollow holes and radial cores, and chaps or cracks situated beside them do not become such objects. The hollow holes referred to herein are volcano-like holes as shown in FIG. 4, while the radial cores referred to herein are double conical etch patterns in a radial direction.

Because it is considered that chaps or cracks are formed also by cuts or by mechanical strains of the cut surface of the carbon fiber, caused by cutting and polishing of the test piece in the standard plasma etching test, they cannot necessarily be considered to be due to the heterogeneity of the internal structure of the carbon fiber per se, such as hollow holes. As compared with generation of holes, chaps or cracks brought about by plasma etching have a much lesser effect upon the performance, quality and reliability of the carbon fiber as a composite material.

Carbon fibers according to the present invention have statistical probabilities of latent holes being detected by the standard plasma etching test of less than about 2.0%, preferably less than about 1.0%, more preferably less than 0.2%. Not only does this not substantially possess visible holes, it is also remarkably excellent in homogeneity of internal structure. Especially, a carbon fiber having a statistical probability of less than about 0.2% latent holes being detected means that the fiber has a substantially homogeneous internal structure without having structural defects, remarkably increasing dependability when such carbon fiber is used in components for airplanes, rockets, etc.

In addition, carbon fibers according to the present invention not only have a remarkably high degree of internal structure homogeneity, but are also characterized by having a tensile strength of at least 150 kg/mm$^2$ and a Young's modulus of at least about $15\times10^3$ kg/mm$^2$. A carbon fiber having a tensile strength of less than 150 kg/mm$^2$ and a Young's modulus of less than $15\times10^3$ kg/mm$^2$ (for example a carbon fiber from petroleum pitch) even if the homogeneity of the structure is good, has a low tensile strength and Young's modulus, and cannot be used for any uses requiring homogeneity of the internal structure, as determined by the standard plasma etching test defined herein. When the conditions of (a) high homogeneity of internal structure as determined by the standard plasma etching test of the present invention, (b) a high tensile strength and (c) a high Young's modulus are satisfied, the usefulness of the resulting carbon fiber is improved for the first time.

Accordingly, acrylic fibers are preferable as the organic polymeric fibers to be converted to carbon fibers which satisfy the conditions of such internal structure, high tensile strength and high Young's modulus according to the present invention. Such acrylic fibers include fibers obtained from polyacrylonitrile (PAN) or a copolymer of at least 85 mol %, preferably at least 95 mol % of acrylonitrile (AN) and at least one vinyl monomer coplymerizable with said acrylonitrile (AN). As said vinyl monomer copolymerizable with said acrylonitrile (AN), there may be cited, for example, acrylic acid, methacrylic acid and salts thereof, acrylates, methacrylates, itaconic acid, vinylether, vinyl chloride, vinylidene chloride, vinyl acetate, hydroxy alkyl acrylic compounds, vinyl pyridine, acrolein, methacrolein, vinyl sulphonic acid and salts thereof, arylsulphonic acid and salts thereof, methacrylsulphonic acid and salts thereof, vinylbenzene sulphonic acid and salts thereof, α-chloroacrylonitrile, methacrylonitrile, acryl amides, and methacryl amides.

Carbon fibers according to the present invention may be advantageously produced industrially by the following process of the present invention.

The process according to the present invention comprises (a) oxidation of organic polymeric fibers in a special way to be described hereinafter, and (b) carbonization of the oxidized fibers.

In the oxidation treatment step of the process of the present invention, the organic polymeric fibers are not heated in an atmosphere of a high temperature oxidizing gas as in existing processes. By contrast, the fibers are repeatedly brought into contact with the surface of a heated body which is heated at about 200°-400° C., preferably at about 260°-380° C., to be heated. When the temperature on the surface of the heated body becomes less than about 200° C., a long period of time is required for oxidation of the fiber, and is not preferable for industrial production. On the other hand, when the temperature on the surface of the heated body exceeds about 400° C., besides difficulty of designing the heated body, it becomes difficult to convert the organic polymeric fiber to a pliable oxidized fiber by preventing the fibers from filament bonding. Also, oxidative degradation occurs, the fibers tend to break during the heating and continuous oxidation becomes difficult. Therefore, this is not preferable.

It is important that, when a contact time per single contact of the fiber with the surface of the heated body ($T_1$) exceeds about 1 second, filament bonding of single filaments of the resulting oxidized fibers is brought about and pliability of the resulting oxidized fibers tend to be lost. From such an unpliable oxidized fiber, a carbon fiber satisfying the tensile strength and Young's modulus defined in the present invention is not obtained. When said contact time ($T_1$) becomes large, the fiber breaks during the oxidation procedure and continuous heating becomes impossible. On the other hand, the lower limit of contact time ($T_1$) is not particularly limited. However, it undergoes restriction from the viewpoint of designing a heating apparatus. For example, when the heated body is a roller, as will be mentioned later, in order to keep the contact time ($T_1$) less than about 1 second, it is necessary to increase the r.p.m. of the roller when the diameter of the roller is larger. However, in such a large heating roller, there is a limit from the viewpoint of design, such as design of the heating apparatus as a whole, or design of the winding structure for the oxidized fiber which is oxidized at a high speed.

It is preferable to make the contact frequency of the organic polymeric fiber with the surface of a heated body such that the total contact time, i.e. the sum total of all $T_1$ values, less than about 30 minutes, preferably from about 2 to 20 minutes. Namely, when the total contact time exceeds about 30 minutes, the oxidation treatment time becomes excessively long and little contribution is made to the advancement of productivity. On the other hand, to make the total contact time less than about 2 minutes is quite possible in principle; however, this is accompanied by restrictions respecting the apparatus, and the practical merit thereof is not great.

Next, as mentioned above, in the oxidation process of the present invention, the fiber is heated by contact with a heated body and converted to an oxidized fiber, and it is natural that the existence of the oxidizing gas is necessary for oxidizing the fiber. However, in the process of the present invention, it is necessary to keep the oxidizing gas at a temperature lower than that of the surface of the heated body, preferably within a temperature range of from room temperature to about 200° C. When the temperature of the oxidizing gas becomes the same as or higher than the temperature of the surface of the heated body, filament bonding of single filaments takes place in the oxidation, parts of the single filaments break to form fuzz, and a pliable oxidized fiber is not obtained. Sometimes an uncontrolled exothermic reaction even occurs, and the fiber burns.

Known oxidizing gases may be used, such as air, air containing oxygen, ozone or a mixture thereof. However, from the viewpoint of workability, conservation and administration of the oxidation process, air is preferable.

The oxidizing gas may be kept at a predetermined temperature less than that of the surface of the heated body, or the gas supplied to the oxidation process may be circulated. However, from the viewpoint of energy loss, apparatus design or procedural administration, it is preferable to supply air at room temperature.

In the oxidation process of the present invention, the fibers should be brought into and out of contact repeatedly with the surface of the heated body so that the fibers are heated until the water absorbability of the oxidized fibers becomes about 3.5–15%, preferably about 5–10%. When this water absorbability is less than 3.5%, the oxidation of each oxidized fiber is insufficient and the carbon fibers do not have good mechanical properties. When this water absorbability exceeds 15%, oxidation becomes excessive, carbonization yield lowers, and the mechanical properties of each carbon fiber suffer due to oxidative degradation.

The value of "water absorbability" herein referred to is obtained as follows:

About 2 g of oxidized fibers are measured and left to stand for 16 hours in a desiccator whose temperature and humidity are controlled at 25° C. and 81%, respectively, with an aqueous solution of saturated ammonium sulfate in which a solid phase co-exists. The fibers are thereafter taken out and measured and reported as (W). Next, after drying the oxidized fibers in a 120° C. constant temperature dryer for 2 hours, this value is measured again and reported as $W_0$. The water absorbability is calculated from the following equation:

$$\text{Water absorbability} = (W - W_0)/W_0 \times 100$$

The heated body used in the oxidation process of the present invention may be a heated roll, a heated plate or the equivalent, and the heated body may be used alone or in combination. However, when the fibers are filamentary, such as filaments or tow, a roll is preferable in regard to productivity of the oxidation apparatus and process efficiency. When the fibers are in the form of woven fabrics, knitted fabrics, non-woven fabrics or wide tows, a heated plate or combination of a roll with a heated plate is preferably used.

In the process of the present invention, it is preferable to control the surface temperature of the heated body and the contact time of the fiber with the surface of the heated body (in case the heated body is a roll, the r.p.m. of the roll) so that the line speed of the fibers passing through the oxidation process is at least about 20 m/min, preferably about 30–1000 m/min. When this line speed is at least 20 m/min, it becomes possible to connect the spinning process (such as spinning and drawing of the organic polymeric fiber) directly to the oxidation process of the present invention and to produce continuously oxidized fibers from the organic polymer. Thus, productivity is improved and economy is achieved by avoidance of other process steps.

The resulting oxidized fibers are heated by use of carbonization procedures which are known per se in an atmosphere of an inert gas at a temperature of at least about 800° C., preferably about 1000°–1600° C., for example, nitrogen, argon or helium, and are thus converted to carbon fibers.

Hereinbelow, the oxidation process which is characteristic of the process of the present invention will be explained specifically by reference to the accompanying drawings.

Figure 5:
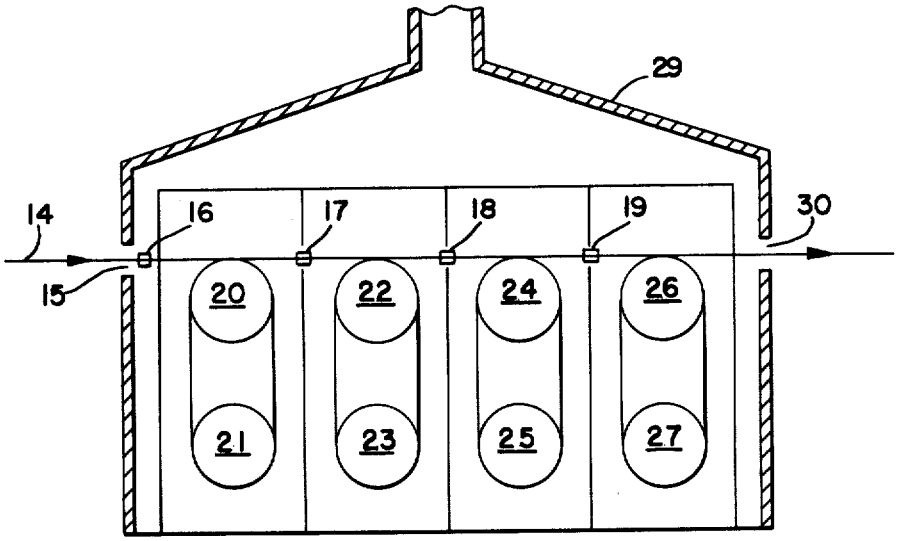
FIGS. 5 and 6 are views in longitudinal and transverse cross section, respectively showing one embodiment of an apparatus which may be used in the oxidation step of the present invention.
Figure 6:
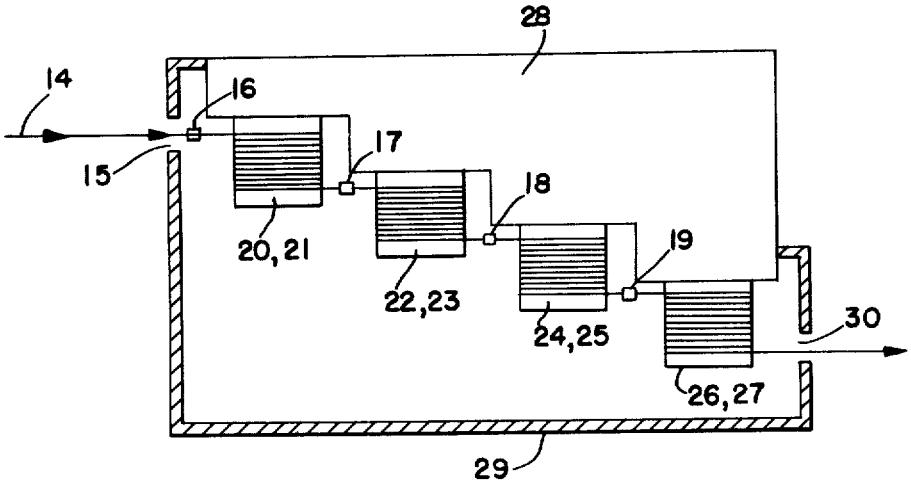

FIG. 5 and FIG. 6 are longitudinal and transverse cross sections, respectively, showing one embodiment of the oxidation apparatus used in the process of the present invention. Reference numeral 14 designates an organic polymeric fiber yarn, 15 designates a yarn inlet, 16, 17, 18 and 19 designate yarn passage guides, 20–21, 22–23, 24–25 and 26–27 designate four pairs of rollers, respectively, 28 designates a roller mounting frame, 29 designates a cover box and 30 designates a yarn outlet. The yarn 14 is wound around the four pairs of rollers 20–21, 22–23, 24–25, 26–27 via the yarn inlet 15. In the frame 28 on which rollers are mounted, although not shown, devices for heating the respective rollers at predetermined temperatures and driving devices for revolving the respective pairs of rollers at predetermined speeds are provided. These rollers are heated so that their surface temperatures are about 200°–400° C. The surfaces of the respective rollers may be heated at the same temperatures and the temperature may be varied within the range. It is preferred to cover the oxidation apparatus of the present invention with a cover box 29 to prevent heat loss from the respective roller surfaces and to cover the thermal decomposition gas generated as the oxidation of the fiber proceeds. In this case, in front of the cover box 29, a door is provided which can be opened and closed up and down and a counterweight is provided to improve workability.

In this apparatus, by opening the front door of the cover box 29, the yarn 14 is wound around the four pairs of rollers a predetermined number of times. Next, the roller heating devices are operated and the roller revolving devices of the frame 28 are driven to run the yarn 14 inside the oxidation apparatus. The number of times of winding the yarn around the respective rollers vary depending upon the size (e.g. total denier) of the yarn 14 and the line speed of the yarn 14. However, the yarn 14 is so wound as to make the water absorbability of the resulting oxidized fiber a value within the range of about 3.5–15%. The revolutions per minute of the group of rollers are so established as to make the contact time per single contact ($T_1$) of the yarn on the surfaces of the respective rollers less than about 1 second. Accordingly, in such an apparatus as illustrated, the larger the diameters of the rollers, the higher the available revolutions per minute of the rollers. Thus the line speed of the yarn 14, namely, the productivity of the oxidized fiber can be increased. However, from the viewpoint of design and manufacture of the apparatus, such as the heat capacity of the heating apparatus and the revolving structure of the rollers and the supporting structure of the rollers on the frame, the diameters of the rollers are preferably within the range of about 50–1000 mm.

With respect to the diameters of the rollers, the number of pairs of the rollers and the method of winding the yarn around the rollers, various other embodiments are applicable. For example, when the diameters of the rollers are small, when the rollers are disposed concentrically and a composite roller consisting of a plurality of rollers is used, it is possible to keep the single contact time ($T_1$) less than about 1 second, and to provide a high oxidizing speed. Threading of the rollers may be carried out in a Nelson arrangement or a zigzag arrangement.

However, as will be mentioned later, in order to connect the spinning process (such as spinning and drawing the organic polymeric fiber) directly to said oxidation process and to continuously convert the organic polymer to an oxidized fiber, which is one of the characteristics of the process of the present invention, it is preferred to run the fiber inside the oxidation apparatus illustrated in said FIG. 5 and FIG. 6 at a speed of at least about 20 m/min, preferably at about 30–1000 m/min. In order to carry out the oxidation at such high speed, the oxidation apparatus used in the present invention should be designed by taking into account the diameters of the rollers and the number of windings of the yarn.

In oxidized fibers obtained by the process of the present invention, insofar as the single contact time ($T_1$) of the fiber with the surfaces of the rollers is less than about 1 second, filament bonding of individual filaments does not take place and it is possible to make the oxidized fiber pliable. Moreover, it is possible easily to obtain oxidized fibers having a optional degree of water absorbability by controlling the frequency of contacts or the contact time of the surfaces of the rollers with the fibers.

As stated, the oxidized fibers obtained by the aforesaid process are heated in an atmosphere of an inert gas such as nitrogen, argon or helium at a temperature of at least about 800° C., preferably about 1000°–1600° C., to be converted to carbon fibers. And when it is desired, it is possible to heat the resulting carbon fibers in an inert gas at a further higher temperature (e.g. about 3000° C.) to convert the carbon fibers to graphite fibers.

It is surprising that despite the fact that the oxidized fibers obtained by the process of the present invention often have the aforesaid biconical structure, carbon fibers which do not substantially contain the aforesaid visible holes and which are homogeneous in terms of internal structure so that the probability of latent holes detection by the standard plasma etching test is less than about 2%, a product having a high tensile strength and a high Young's modulus is obtained.

This is considered true because the oxidation process of the present invention is different from known oxidation procedures carried out in an atmosphere of a high temperature oxidizing gas in structure by which an organic polymeric fiber is heated and oxidized.

As will now be apparent, the process of the present invention places emphasis upon the oxidation step; by adopting such oxidation step a variety of superior effects are obtained.

The process of the present invention has the ability to accomplish the oxidation of organic polymeric fibers at a high speed, not only increasing productivity, but also simplifying control of oxidation treatment speed. Therefore, it is possible to relate the speed of the oxidation process to spinning speeds, such as spinning and drawing speeds utilized in production of the organic polymeric fiber to enable the adoption of continuous steps from spinning to oxidation of the organic polymeric fiber.

Further, it is substantially unnecessary to use an oxidizing gas kept at a high temperature. Accordingly, it is unnecessary to preheat any oven for increasing the temperature of the oxidizing gas.

Still further, even when difficulties appear, due to the formation of thermal decomposition products of the organic polymeric fiber, for instance, the process has advantages. Even when the tarry substances are formed and adhere to guides in the oven, they can be easily cleaned out, without necessarily having to interrupt the operation, and the workability and productivity of the process are not reduced.

Further, carbon fibers obtained by the process of the present invention have high tensile strength and a high Young's modulus. The carbon fibers have excellent homogeneity, and have a statistical probability of latent holes being detected by the standard plasma etching test of less than about 2.0%. They have a tensile strength of at least about 150 kg/mm$^2$ and a Young's modulus of at least about $15\times10^3$ kg/mm$^2$.

Hereinafter, the present invention will be explained more specifically by reference to examples; however, the present invention is not intended to be limited to these examples.

In the following examples, the values of tensile strength, elongation and Young's modulus are determined as follows:

A multifilament carbon fiber sample is embedded in an impregnation resin consisting of 100 parts of "Epikote 828", 3 parts of $BF_3$.MEA (a complex of boron trifluoride and monoethylamine) and 20 parts of methylethylketone wound up around a wooden frame and cured at 200° C. for 30 minutes by a hot air dryer. Thereafter, a tensile test is carried out.

1. Tensile Test Conditions

| | |
|---|---|
| Chuck | Air chuck(surface: soft asbestos) |
| Sample length 1. | 200 mm |
| Tensile speed | 5mm/min |

2. Cross Sectional Area

A 1.5 m long carbon fiber multifilament is precisely cut and its weight W (g/m) is measured. On the other hand, the specific gravity p (g/cm$^3$) of the multifilament is determined by Archimedes' method. Then, the cross sectional area S of the carbon fiber multifilament is:

$$S = \frac{W}{\rho}\ (\mathrm{mm}^2)$$

3. Tensile Strength

From the breaking load P (kg) of the tensile test, tensile strength TS is:

$$TS = \frac{P}{S}\ (\mathrm{kg/mm}^2)$$

4. Young's Modulus

The initial gradient A (kg/mm) of a "tensile strength (kg)-elongation (mm) curve" of the tensile test is determined and the Young's modulus YM is determined from the following equation.

$$YM = \frac{A \times l_o}{S} \text{ (kg/mm}^2\text{)}$$

COMPARATIVE EXAMPLE 1

Various commercial carbon fibers having a high tensile strength and high modulus were selected to provide for the standard plasma etching test defined above.

The statistical probabilities of the hole formation being detected in the standard plasma etching test were measured and are shown in Table I.

The tensile strengths and Young's modulus are also shown in Table I.

It is shown that all of the commercially available carbon fibers have latent holes as tested in the standard plasma etch test, and their statistical probabilities were more than 2%.

Moreover, Sample C in Table I has both visible and latent holes.

TABLE I

Figure 7:
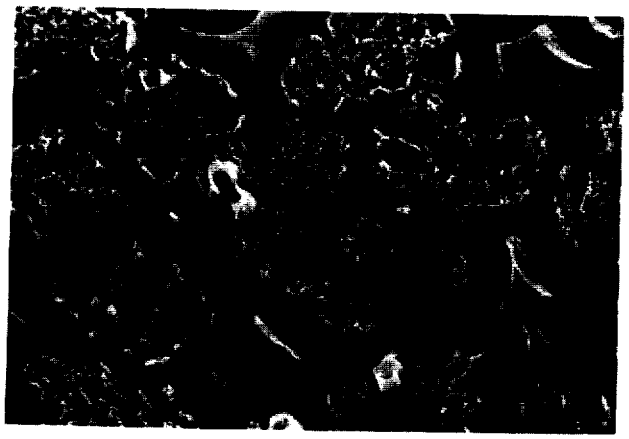
FIGS. 7–10 are scanning electron photomicrographs of various commercially available carbon fibers taken upon carrying out the aforementioned standard plasma etching test.
Figure 8:
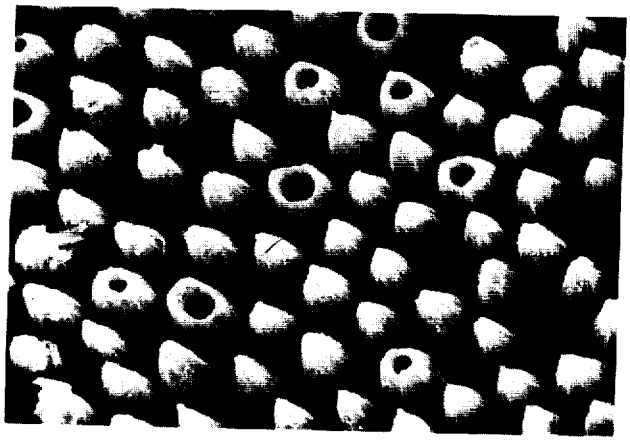
Figure 9:
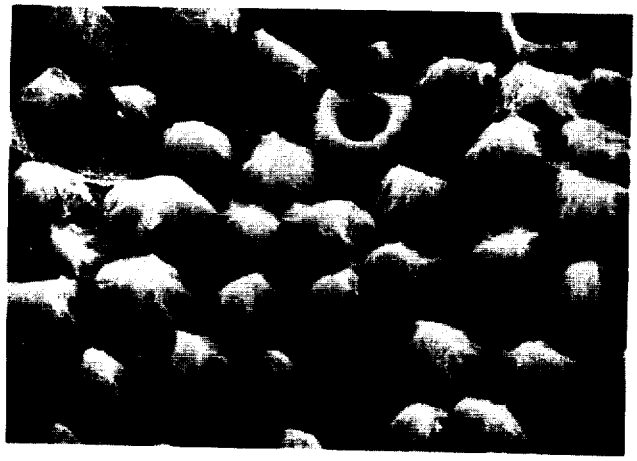
Figure 10:
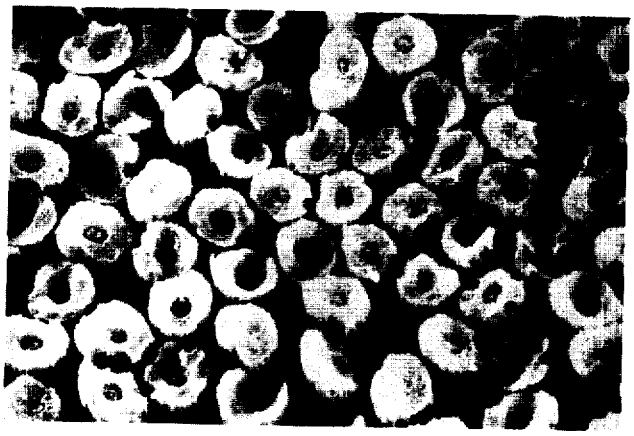

| Fiber | Precursor fiber | Carbon fiber characteristics: Tensile Strength (Kg/mm²) | Young's modulus (×10³kg/mm²) | Probability of hole formation (%) | Reference |
|---|---|---|---|---|---|
| A | Cellulose | 84 | 4 | 0 | |
| B | Cellulose | 190 | 35 | more than 90 | FIG. 7 |
| C | Polacrylonitrile | 322 | 19.1 | 19 | FIG. 8 |
| D | Polyacrylontrile | 300 | 22 | 9 | |
| E | Polyacrylonitrile | 305 | 21 | 6 | FIG. 9 |
| F | Polycrylonitrile | 280 | 23 | more than 80 | FIG. 10 |

EXAMPLE 1

An acrylic fiber of 1,500 filaments which is obtained by spinning a copolymer consisting of 99 mole % of acrylonitrile and 1 mole % of 2-(hydroxybutyl)acrylonitrile is heated by intermittent contact on a heated pin of 100 mm in diameter and 100 mm in length and is converted to an oxidized fiber.

The surface temperature of the heated pin is maintained from 285° to 290° C. in the oxidation step.

Table II shows the relations between contact time ($T_1$) and the filament bonding of the oxidized fiber which resulted. The filament bonding is caused when the contact time $T_1$ of the fiber on the surface of the heated pin is more than 1 second.

TABLE II

| Contact Time ($T_1$) (sec) | Filament Bonding |
|---|---|
| more than 7 | Filament bondings present |
| about 5 | Filament bondings partially present |
| less than 1 | Filament bondings absent |

EXAMPLE 2

An acrylic fiber of 3,000 filaments obtained by spinning a copolymer consisting of 99 mole % of acrylonitrile and 1 mole % of methylacrylate, is continuously converted to oxidized fibers using an oxidation machine as shown in FIGS. 5 and 6 of the drawings. In FIGS. 5 and 6 a group of heated rollers 20, 21, 22, 23, 24, 25, 26, 27 is covered with a simple cover 29. This oxidation machine comprises four pairs of heated rollers (20,21), (22,23), (24,25) (26,27). These are stainless steel rollers, 200 mm in diameter and 300 mm in length, and have internal heating elements (hot roll). These heating elements are joined to a 220 V source and controlled electrically with a two-position control.

The surface temperature of the heated rollers is measured using an Anritsu Keiki surface thermometer, type HP-4P.

The acrylic fibers are roller over each pair of rollers, one of a pair of rollers is capable of being adjusted in the axial direction of the roller to conduct a controlled operation. At the inlet of each roller pair, yarn guides 16, 17, 18, 19 are attached in order to control the yarn line. The acrylic fibers are oxidized to form oxidized fibers at 30 meters per minute of yarn line speed, wherein the contact time $T_1$ is 0.63 seconds. The total of the contact times $T_1$ is 7.7 minutes, and the temperature of the atmosphere in the vicinity of the heated roller is 110° C. during oxidation. The resulting oxidized fibers are pliable and have no filament bonding. The water absorbability of the oxidized fibers, as measured, was 6.7 wt %. The oxidized fibers were embedded in a resin comprising 2 parts of parafin, 1 part of ethylcellulose and one part of stearic acid, and were cut into slices of 7 microns in width using a microtome, obtained by Nippon Microtome Laboratory. They were examined under a microscope at magnifications up to 600×.

Figure 12:
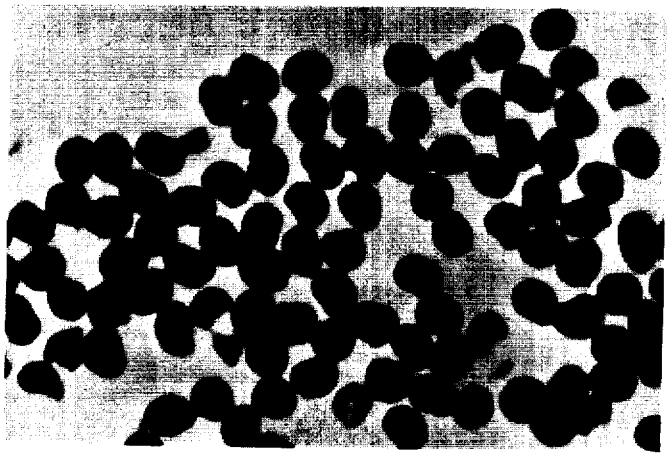
FIG. 12 is an optical photomicrograph showing a cross section of an oxidized fiber obtained by one embodiment of the present invention.

These oxidized fibers appeared to have a biconical structure as shown in FIG. 12.

The oxidized fibers were carbonized to carbon fibers in a tubular carbonizing furnace, 1000 mm in length, wherein the temperature profile of the carbonizing furnace is described in FIG. 11.

The fibers were continuously carbonized at a temperature of 1300° C. and at a line speed of 1 meter per minute. The properties of the resulting carbon fibers are shown in No. 4 of Table III.

The carbon fibers were examined by the standard plasma etching test defined in the present specification.

Figure 13:
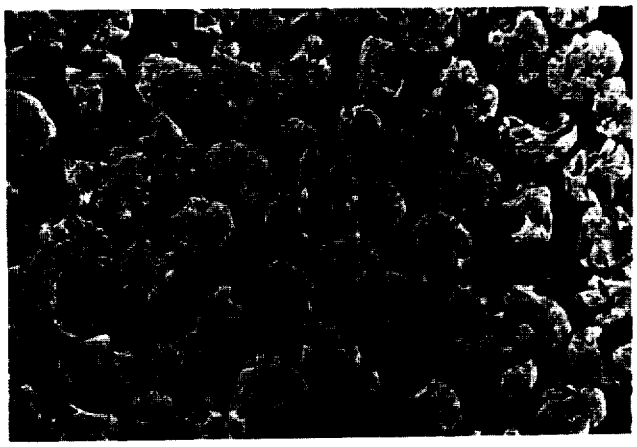
FIGS. 13–17 are electron photomicrographs taken in the course of running a standard plasma etching test on a carbon fiber produced according to the present invention.

The carbon fibers did not have any holes defined in their cross sections. Photographs pursuant to this test are shown in FIG. 13.

TABLE III

| No. | Line Speed in Oxidation m/min | Contact Time $T_1$ second | $\Sigma T_1$ minute | Surface Temperature of Rollers °C. | Water Absorbability wt % | Properties of Carbon Fiber: Tensile Strength kg/mm² | Young's Modulus × 10³kg/mm² | Failing Strain % | Reference |
|---|---|---|---|---|---|---|---|---|---|
| 1(control) (Example 3) | 5.3 | 3.56 | 15 | 285 | 8.4 | 215 | 21.2 | 1.01 | |
| 2 (control) (Example 4) | 10 | 1.88 | 10 | 285 ~ 315 | 7.2 | 254 | 22.6 | 1.12 | |

TABLE III-continued

| No. | Line Speed in Oxidation m/min | Contact Time $T_1$ second | $\Sigma T_1$ minute | Surface Temperature of Rollers °C. | Water Absorbability wt % | Properties of Carbon Fiber: Tensile Strength kg/mm² | Young's Modulus × 10³kg/mm² | Failing Strain % | Reference |
|---|---|---|---|---|---|---|---|---|---|
| 3 (Example 5) | 20 | 0.94 | 9.8 | 285 ~ 315 | 7.5 | 288 | 22.5 | 1.28 | |
| 4 (Example 2) | 30 | 0.63 | 7.7 | 285 ~ 330 | 6.7 | 300 | 22.1 | 1.36 | |
| 5 (Example 6) | 77 | 0.25 | 6.0 | 285 ~ 330 | 6.9 | 310 | 22.0 | 1.41 | FIG. 14 |
| 6 (Example 7) | 185 | 0.10 | 5.0 | 285 ~ 340 | 6.6 | 320 | 21.7 | 1.47 | |
| 7 (Example 8) | 210 | 0.09 | 5.0 | 285 ~ 340 | 6.4 | 322 | 21.5 | 1.50 | FIG. 15 |

EXAMPLES 3-8

In these examples acrylic fibers as in Example 2 were used and the oxidation procedure was similar, but instead of 30 meters per minute of yarn speed in the oxidation step the acrylic fibers were oxidized at 5.3, 10, 20, 77, 185 and 210 meters per minute.

The running conditions and the water absorbabilities of the resulting oxidized fibers are shown as Nos. 1, 2, 3, 5, 6 and 7 in Table III. After conducting the oxidation procedures, the oxidized fibers of Example 3 had filament bonding to some extent, but others were pliable and had not filament bonding (No. 1 in Table III). These oxidized fibers were carbonized up to 1300° C., as in Example 2, to produce carbon fibers.

The carbon fibers were examined by applying the standard plasma etching test, and the resulting carbon fibers did not have any holes as defined in the present invention in any case including Examples 3, 4, 5, 6, 7 and 8.

Figure 14:
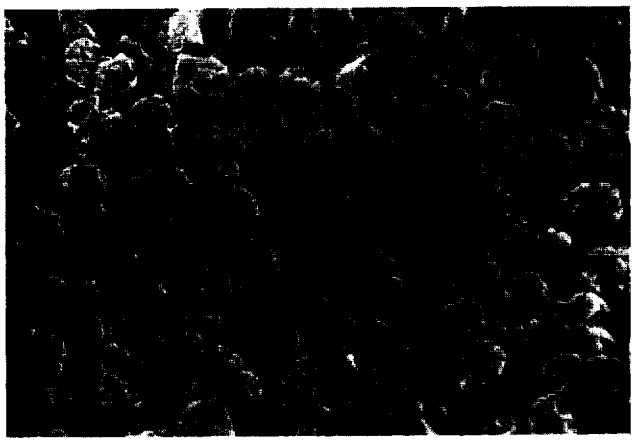
Figure 15:
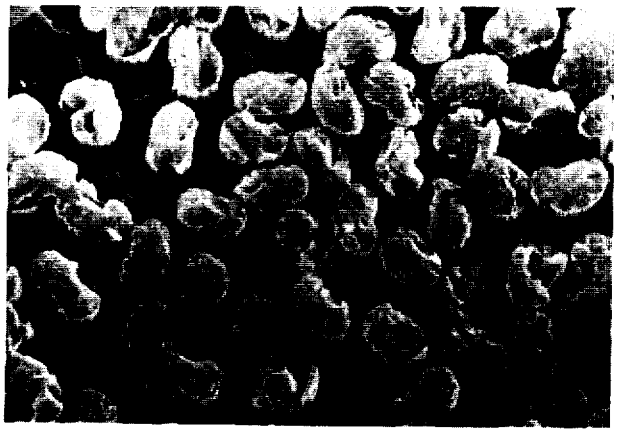

Partial photographs appearing in Examples 6 and 8 are shown in FIGS. 14 and 15, respectively.

EXAMPLE 9

In this example, acrylic fibers as in Example 2 were used, and the oxidation procedure was similar to Example 8, but the surface temperature of the heated rollers was maintained at from 300° to 350° C., and the total contact time $T_1$ was 2.8 minutes. The resulting oxidized fibers were pliable and had no filament bonding, and the water absorbability of the oxidized fibers was 4.5 wt %.

These oxidized fibers were carbonized as in Example 2 to produce carbon fibers which had the properties described under No. 8 in Table IV.

The carbon fibers did not have any holes as defined above according to the standard plasma etching test.

EXAMPLE 10

In this example acrylic fibers as in Example 2 were used, and the oxidation procedure was similar, but the surface temperature of the heated rollers was maintained at 280° C. and the total contact time $T_1$ was 30 minutes in all. The resulting oxidized fibers were pliable and had no filament bonding, and their water absorbability was 9.3 wt %. The oxidized fibers were carbonized as in Example 2 to produce carbon fibers whose properties are shown as No. 9 in Table IV.

The carbon fibers were examined by use of the standard plasma etch test and did not have any defined holes.

EXAMPLE 11

The oxidation procedure was similar to Example 10, but instead of oxidizing at a surface temperature of 280° C. of the heated rollers, the heated rollers were maintained at 285° C., and produced oxidized fibers which were pliable and had no filament bonding, and had a water absorbability value of 11.0 wt %.

The oxidized fibers were carbonized as in Example 2 to produce carbon fibers having properties as shown at No. 10 of Table IV.

The carbon fibers did not have any holes as defined above, according to examination using the standard plasma etch test.

EXAMPLE 12

The procedure of Example 2 was repeated to examine the effect of atmospheric temperature in the vicinity of the heated rollers. The oxidation procedure was similar to Example 2, except that the damper in the duct attached on the cover was almost closed.

The resulting oxidized fibers were pliable and had no filament bonding and their water absorbability was 6.9 wt %.

During oxidation the atmospheric temperature in the vicinity of heated rollers was measured as 160° C., which value is higher than that of Example 2.

This procedure saved about 10% of the electricity consumption in comparison with Example 2.

The resulting oxidized fibers were also carbonized up to 1300° C. as in Example 2 to produce carbon fibers the properties of which are shown in No. 11 of Table IV.

EXAMPLE 13

In this example the oxidation procedure was similar to Example 6, except that the surface temperature of the heated rollers was maintained at 300° C. throughout.

The resulting oxidized fibers were pliable and had no filament bonding. The water absorbability of the oxidized fibers was 5.2 wt %.

The carbon fibers were carbonized as described as in Example 2 and their properties are shown in No. 12 Table IV. These carbon fibers did not have any holes as defined above according to examination by the standard plasma etch test.

Figure 16:
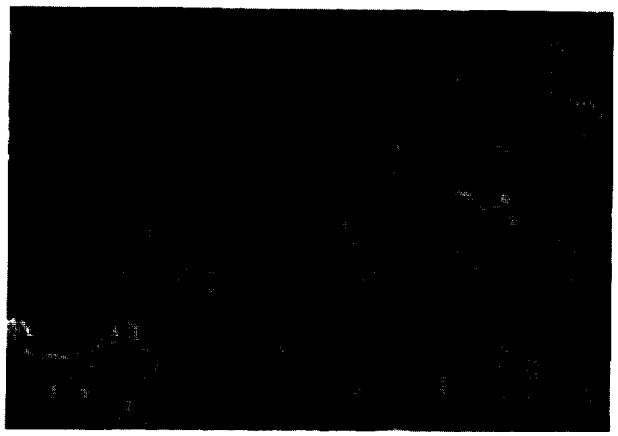

Partial photographs resulting from this test are shown in FIG. 16.

EXAMPLE 14

In this example the oxidation procedure was similar to Example 6, except that the surface temperature of the heated rollers was maintained at 305° C.

The resulting oxidized fibers were pliable and had no filament bonding. Their water absorbability was 5.6 wt %.

The oxidized fibers were carbonized as in Example 2 to produce carbon fibers whose properties are shown in No. 13 of Table IV.

The carbon fibers did not have any holes as defined above according to examination by the standard plasma etch test.

Figure 17:
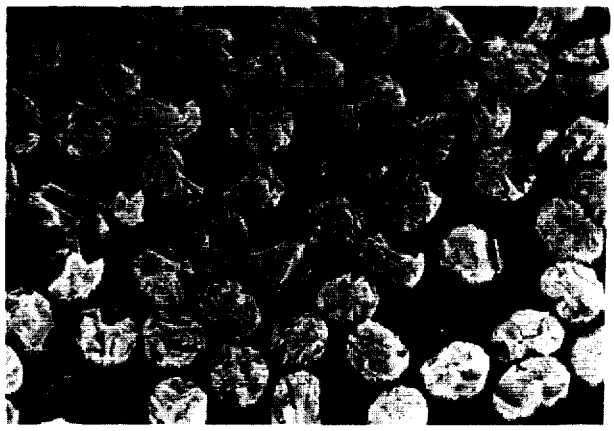

Partial photographs resulting from this test are shown in FIG. 17.

EXAMPLE 15

1500 filaments of acrylic fibers obtained from spinning a copolymer consisting of 99.2 mole % of acrylonitrile and 0.8 mole % of itaconic acid were used in this example.

The oxidation procedure was similar to Example 2. The resulting oxidized fibers were pliable and had no filament bonding.

The water absorbability of the oxidized fibers and the properties of the carbon fibers are shown in No. 14 of Table IV. The carbon fibers did not have any holes as defined by examination using the standard plasma etch test.

TABLE IV

| No. | Line Speed Oxidation m/min | Contact Time $T_1$ second | $\Sigma T_1$ minute | Surface Temperature of Rollers °C. | Water Absorbability wt % | Properties of Carbon Fiber: Tensile Strength kg/mm² | Young's Modulus × $10^3$kg/mm² | Failing Strain % |
|---|---|---|---|---|---|---|---|---|
| 8 | 210 | 0.09 | 2.8 | 300 ~ 350 | 4.5 | 279 | 19.0 | 1.47 |
| 9 | 30 | 0.63 | 30 | 280 | 9.3 | 284 | 23.1 | 1.23 |
| 10 | 30 | 0.63 | 30 | 285 | 11.0 | 280 | 23.6 | 1.19 |
| 11 | 30 | 0.63 | 7.7 | 285 ~ 330 | 6.9 | 303 | 21.4 | 1.42 |
| 12 | 77 | 0.25 | 6.0 | 300 | 5.2 | 294 | 20.7 | 1.42 |
| 13 | 77 | 0.25 | 6.0 | 305 | 5.9 | 290 | 20.1 | 1.44 |
| 14 | 30 | 0.63 | 7.7 | 285 ~ 330 | 7.2 | 294 | 21.7 | 1.35 |

EXAMPLE 16

Carbon fibers obtained by the method of Example 2 were heated up to 2400° C. in a nitrogen atmosphere using a 1 meter graphitizing furnace. This process was continuously conducted at 0.7 meters per minute of line speed.

The properties of the resulting graphitized fibers are shown by the following Table V.

TABLE V

| | |
|---|---|
| Tensile Strength | 248 kg/mm² |
| Young's modulus | 39.2 × $10^3$kg/mm² |
| Failing strain | 0.63% |

EXAMPLE 17

Carbon fibers obtained from the method of Example 2 were conducted to be oxidized by the procedure of electrolysis well known in the prior art.

The resulting oxidized carbon fibers were impregnated in an epoxy resin comprising 100 parts by weight of "Epikote 828" (manufactured by Shell Oil Co.) and 3 parts of the complex of boron trifluoride and monoethylamine.

The impregnated fibers were laid into a mold, the mold was closed, and the product was precured for 1 hour at 170° C. followed by postcuring for 2 hours at 170° C. The resulting composite had fiber volume fractions of 61%. The specimens were cut from the composite and their mechancial properties were measured using an Instron Type 1114 tester (Instron Corporation). The results are shown in Table VI.

Control

For comparison purposes, a commercially available carbon fiber having a tensile strength of 280 kg/mm² and a Young's modulus of 23×$10^3$ kg/mm², which was obtained by the usual oxidation procedure using a hot air oven, was impregnated with a similar resin and cured as described above.

The resulting composite specimen was found to have fiber volume fractions of 65% and its mechanical properties were measured and determined as shown in Table VI.

These commercially available carbon fibers were examined by use of the standard plasma etching test. They were found to have 9% of latent hole formations, according to this test.

TABLE VI

| | Carbon fiber | Example 17: Obtained by Example 2 | Control: Commercial Carbon Fiber |
|---|---|---|---|
| | Fiber volume fraction of composite (%) | 61 | 65 |
| Mechanical properties of composite | Flexible strength (kg/mm²) | 169 | 151 |
| | Interlaminar shear strength (kg/mm²) | 8.1 | 7.5 |
| | Tensile strength (kg/mm²) | 170 | 148 |

COMPARATIVE EXAMPLE 2

The acrylic fibers used in Example 2 were heated for 15 minutes residence time in an oven in which hot air was circulated, and its temperature was maintained at 300° C.

The resulting oxidized fibers were brittle and had some filament bondings.

COMPARATIVE EXAMPLE 3

The oxidation procedure was similar to Comparative Example 2, except that the air temperature was maintained at 305° C.

In this example, a vigorous exthothermic reaction occurred during oxidation and the acrylic fibers burned out.

EXAMPLE 18

In this example the process of spinning acrylic fibers was continuously connected to the process of the oxidation. A strand of 1500 filaments of acrylic fibers was spun, using a copolymer consisting of 99 mole % of acrylonitrile and 1 mole % of 2-(hydroxybutyl)acrylonitrile. The strand was washed with hot water, stretched, dried, drawn from dryer at a line speed of 120 meters per minute, and then continuously followed by a process of oxidation, wherein said acrylic fibers were heated on the surfaces of three pairs of hot rollers at a line speed of 120 meters per minute. This speed corresponded to the above speed of the yarn when drawn from the dryer. In the process of oxidation the surface temperatures of three pairs of heated rollers were maintained at 285°, 290° C. and 305° C. respectively.

The contact time $T_1$ of the acrylic fibers on the surfaces of the heated rollers was 0.24 seconds, and the total contact time $T_1$ was 9.6 minutes during the oxidation procedure.

The resulting oxidized fibers were pliable and did not have any filament bonding. The water absorbability of the oxidized fibers was 7.5 wt %. These oxidized fibers were carbonized to carbon fibers in a carbonizing furnace heated up to 1300° C. in a nitrogen atmosphere, using a procedure similar to Example 2. The properties of the resulting carbon fibers are shown in the following Table VII.

TABLE VII

| | |
|---|---|
| Tensile strength | 295 kg/mm$^2$ |
| Young's modulus | 22.1 × 10$^3$kg/mm$^2$ |
| Failure strain | 1.33% |

Various modifications, changes, alterations and additions can be made in the present method and product. All such modifications, substitutions, additions and the use of equivalent components, ingredients or method steps form a part of the present invention as defined in the appended claims.

I claim the following:

1. A process for producing a carbon fiber having high tensile strength which comprises oxidizing an organic polymeric fiber in an oxidizing atmosphere by intermittently contacting and removing said organic fiber on and from a heated body having a surface temperature from about 200° to about 400° C. wherein the contact time of said organic fiber on the heated body per single contact is less than about 1 second and the temperature of said oxidizing atmosphere is maintained lower [thn] *than* the surface temperature of said heated body, and then carbonizing the oxidized fiber in a non-oxidizing atmosphere at a temperature above about 800° C.

2. A process according to claim 1, wherein the temperature of said oxidizing atmosphere is maintained within the range from room temperature to about 200° C.

3. A process according to claim 1, wherein said oxidizing atmosphere fed to oxidation step is air at room temperature.

4. A process according to claim 1, wherein the contact time per single contact of said organic fiber on the heated body is within the range from about 0.001 seconds to about 0.7 seconds.

5. A process according to claim 1, wherein the total contact time for converting said organic fiber to the oxidized fiber is less than about 30 minutes.

6. A process according to claim 5, wherein the total contact time is within the range from about 2 minutes to about 20 minutes.

7. A process according to claim 1, wherein said heated body is a heated roller.

8. A process according to claim 1 wherein said heated body is a heated plate.

9. A process according to claim 7, wherein the diameter of said heated roller is about 50 mm to about 1000 mm.

10. A process according to claim 1, wherein said organic fiber is a fiber of a polymer comprising at least 85 mole % of acrylonitrile.

11. A process according to claim 10, wherein said polymer comprises acrylonitrile and at least one kind of vinyl monomer which is copolymerizable with said acrylonitrile.

12. A process according to claim 1, wherein the water absorbability of said oxidized fiber is about 3.5 to about 15%.

13. A process according to claim 1, wherein the water absorbability of said oxidized fiber is about 5 to about 10%.

14. A process according to claim 1, wherein the carbonized fiber is subsequently heated to [more than about 3000° C. in a non-oxidizing atmosphere] *up to about 3000° C. in a non-oxidizing atmosphere.*

15. A process according to claim 1, [wherein] *further comprising* the step of spinning the organic fiber [is] *and* directly [connected] *connecting said spinning step to* the oxidizing step [in which] *whereby* said organic fiber obtained from the spinning step is converted continuously to an oxidized fiber.

16. A process according to claim 15, wherein the line speed of the organic fiber in the oxidizing step is more than at least 20 meters per minute and substantially equal to the line speed of the organic fiber in the spinning step.

*17. A process for producing a carbonizable oxidized fiber which comprises oxidizing an organic polymeric fiber in an oxidizing atmosphere by intermittently contacting and removing said organic fiber on and from a heated body having a surface temperature from about 200° to about 400° C. wherein the contact time of said organic fiber on the heated body per single contact is less than about 1 second and the temperature of said oxidizing atmosphere is maintained lower than the surface temperature of said heated body.*

*18. A process according to claim 17, wherein the temperature of said oxidizing atmosphere is maintained within the range from room temperature to about 200° C.*

*19. A process according to claim 17, wherein said oxidizing atmosphere fed to said oxidation step is air at room temperature.*

*20. A process according to claim 17, wherein the contact time per single contact of said organic fiber on the heated body is within the range from about 0.001 seconds to about 0.7 seconds.*

*21. A process according to claim 17, wherein the total contact time converting said organic fiber to the oxidized fiber is less than about 30 minutes.*

*22. A process according to claim 21, wherein the total contact time is within the range from about 2 minutes to about 20 minutes.*

*23. A process according to claim 17, wherein said heated body is a heated roller.*

*24. A process according to claim 17, wherein said heated body is a heated plate.*

*25. A process according to claim 23, wherein the diameter of said heated roller is about 50 mm to about 1000 mm.*

*26. A process according to claim 17, wherein said organic fiber is a fiber of a polymer comprising at least 85 mole % of acrylonitrile.*

*27. A process according to claim 26, wherein said polymer comprises acrylonitrile and at least one kind of vinyl monomer which is copolymerizable with said acrylonitrile.*

*28. A process according to claim 17, wherein the water absorbability of said oxidized fiber is about 3.5 to about 15%.*

*29. A process according to claim 17, wherein the water absorbability of said oxidized fiber is about 5 to about 10%.*

*30. A process according to claim 17, further comprising the step of spinning the organic fiber and directly connecting the spinning step to the oxidizing step whereby said organic fiber obtained from the spinning step is converted continuously to an oxidized fiber.*

*31. A process according to claim 30, wherein the line speed of the organic fiber in the oxidizing step is more than at least 20 meters per minute and substantially equal to the line speed of the organic fiber in the spinning step.*

* * * * *